United States Patent
Mejia et al.

(10) Patent No.: US 10,654,995 B2
(45) Date of Patent: May 19, 2020

(54) PNEUMATIC TIRE

(71) Applicant: The Goodyear Tire & Rubber Company, Akron, OH (US)

(72) Inventors: Luisa Fernanda Munoz Mejia, Troine (LU); Christian Jean-Marie Kaes, Schrondweiler (LU); Bodo Ahrens, Trier (DE); William Alain Talbot, Bastogne (BE); Eric Engeldinger, Redange/Attert (LU); Manuela Pompei, Reuler (LU); Philippe Schmit, Changemelle (BE); Jérôme Joel Daniel Delville, Rehon (FR)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/113,249

(22) Filed: Aug. 27, 2018

(65) Prior Publication Data

US 2019/0062537 A1 Feb. 28, 2019

Related U.S. Application Data

(60) Provisional application No. 62/551,979, filed on Aug. 30, 2017, provisional application No. 62/551,978, filed on Aug. 30, 2017, provisional application No. 62/551,976, filed on Aug. 30, 2017.

(51) Int. Cl.
| | |
|---|---|
| *C08L 9/06* | (2006.01) |
| *C08K 5/5419* | (2006.01) |
| *B60C 1/00* | (2006.01) |
| *C08F 212/08* | (2006.01) |
| *C08K 5/548* | (2006.01) |
| *C08L 9/00* | (2006.01) |
| *C08L 7/00* | (2006.01) |
| *C08L 47/00* | (2006.01) |
| *C08L 91/00* | (2006.01) |
| *C08K 3/36* | (2006.01) |
| *G01N 25/48* | (2006.01) |

(52) U.S. Cl.
CPC ............... *C08L 9/06* (2013.01); *B60C 1/00* (2013.01); *B60C 1/0016* (2013.01); *C08F 212/08* (2013.01); *C08K 3/36* (2013.01); *C08K 5/548* (2013.01); *C08K 5/5419* (2013.01); *C08L 7/00* (2013.01); *C08L 9/00* (2013.01); *C08L 47/00* (2013.01); *C08L 91/00* (2013.01); *C08F 2500/02* (2013.01); *G01N 25/4866* (2013.01)

(58) Field of Classification Search
CPC ...... C08F 212/08; C08F 2500/02; C08L 9/06; C08L 47/00; C08L 7/00; C08L 9/00; C08L 91/00; C08K 5/5419; C08K 5/548; C08K 3/36; B60C 1/0016; B60C 1/00; G01N 25/4866

USPC .......................................................... 152/209.1
See application file for complete search history.

(56) References Cited

U.S. PATENT DOCUMENTS

| | | | |
|---|---|---|---|
| 5,877,249 A | 3/1999 | Lambotte | |
| 6,242,523 B1 | 6/2001 | Blok et al. | |
| 6,245,873 B1 | 6/2001 | Wideman et al. | |
| 6,265,478 B1 | 7/2001 | Kralevich, Jr. et al. | |
| 6,300,449 B2 | 10/2001 | Wideman et al. | |
| 6,429,245 B1 | 8/2002 | Francik et al. | |
| 6,525,133 B1 | 2/2003 | Wideman et al. | |
| 6,550,508 B1 | 4/2003 | Yamaguchi et al. | |
| 7,084,228 B2 | 8/2006 | Labauze et al. | |
| 7,141,622 B2 | 11/2006 | Bowen, III et al. | |
| 7,160,956 B2 | 1/2007 | Heiliger et al. | |
| 7,253,225 B2 | 8/2007 | Labauze et al. | |
| 7,329,704 B2 | 2/2008 | Labauze | |
| 7,411,018 B2 | 8/2008 | Appel et al. | |
| 8,058,357 B2 | 11/2011 | Randall et al. | |
| 8,119,721 B2 | 2/2012 | Kikuchi et al. | |
| 9,441,098 B1 | 9/2016 | Isitman et al. | |
| 9,657,161 B2 | 5/2017 | Saintigny et al. | |
| 9,771,469 B2 | 9/2017 | Sandstrom et al. | |
| 2004/0112490 A1* | 6/2004 | Sandstrom ............... | B60C 11/18 152/152.1 |
| 2005/0209413 A1 | 9/2005 | Labauze et al. | |
| 2007/0066744 A1 | 3/2007 | Weydert et al. | |
| 2013/0165578 A1 | 6/2013 | Francik et al. | |
| 2013/0274375 A1 | 10/2013 | Matsushita | |
| 2013/0296471 A1 | 11/2013 | Lesage et al. | |

(Continued)

FOREIGN PATENT DOCUMENTS

| | | |
|---|---|---|
| DE | 102011055966 A1 | 6/2013 |
| DE | 102015210421 | 12/2016 |

(Continued)

OTHER PUBLICATIONS

European Search Report dated Jan. 8, 2019.

*Primary Examiner* — Angela C Scott
(74) *Attorney, Agent, or Firm* — John D. DeLong

(57) ABSTRACT

The present invention is directed to a pneumatic tire comprising a tread, the tread comprising a rubber composition comprising from 30 to 80 phr of a styrene-butadiene rubber having a Tg ranging from −70 C to −40 C, from 10 to 50 phr of a high vinyl polybutadiene having a Tg ranging from −40 C to −5 C and has an isomeric vinyl 1,2 content in a range of from 50 to 90 percent by weight, and from 10 to 30 phr of a natural rubber or synthetic polyisoprene, silica, a blocked mercaptosilane, a traction resin, and liquid plasticizer selected from the group consisting of a low molecular weight polybutadiene functionalized with a hydroxyl functional group and sunflower oil.

12 Claims, No Drawings

(56) References Cited

U.S. PATENT DOCUMENTS

| | | | |
|---|---|---|---|
| 2014/0171557 A1 | 6/2014 | Ringot | |
| 2016/0090475 A1* | 3/2016 | Nakatani | C08L 9/06 |
| | | | 524/526 |
| 2016/0159147 A1* | 6/2016 | Isitman | B60C 1/0016 |
| | | | 524/508 |
| 2018/0072100 A1 | 3/2018 | Sekine et al. | |
| 2018/0100058 A1 | 4/2018 | Pavon Sierra et al. | |
| 2018/0223082 A1 | 8/2018 | Lesage et al. | |
| 2018/0223083 A1 | 8/2018 | Lesage et al. | |
| 2019/0062537 A1 | 2/2019 | Mejia et al. | |

FOREIGN PATENT DOCUMENTS

| | | |
|---|---|---|
| DE | 102015210422 A1 | 12/2016 |
| EP | 0796893 A1 | 9/1997 |
| EP | 1035164 | 9/2000 |
| EP | 1911797 A1 | 4/2008 |
| EP | 2098384 B1 | 5/2011 |
| EP | 2468815 A1 | 6/2012 |
| EP | 2345696 B1 | 7/2013 |
| EP | 2105462 B1 | 5/2014 |
| EP | 3103655 A1 | 12/2016 |
| JP | 4762562 B2 | 6/2011 |
| WO | 2012069585 A1 | 5/2012 |
| WO | 2016109476 A1 | 7/2016 |
| WO | 2017046766 A1 | 3/2017 |
| WO | 2017046771 A1 | 3/2017 |
| WO | 2017095381 A1 | 6/2017 |
| WO | 2017095563 A1 | 6/2017 |

\* cited by examiner

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a low hysteresis have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, improvements in rolling resistance often occur in tandem with a reduction in wet traction, and vice versa. There is a continuing need, therefore, to develop tread having both good rolling resistance and wet traction.

SUMMARY OF THE INVENTION

The present invention is directed to a pneumatic tire comprising a tread, the tread comprising a rubber composition comprising from 30 to 80 phr of a styrene-butadiene rubber having a Tg ranging from −70 C to −40 C, from 10 to 50 phr of a high vinyl polybutadiene having a Tg ranging from −40 C to −5 C and has an isomeric vinyl 1,2 content in a range of from 50 to 90 percent by weight, and from 10 to 30 phr of a natural rubber or synthetic polyisoprene, silica, a blocked mercaptosilane, a traction resin, and a liquid plasticizer selected from the group consisting of a low molecular weight polybutadiene functionalized with a hydroxyl functional group and vegetable oils.

DETAILED DESCRIPTION OF THE INVENTION

There is disclosed a pneumatic tire comprising a tread, the tread comprising a rubber composition comprising from 30 to 80 phr of a styrene-butadiene rubber having a Tg ranging from −70 C to −40 C, from 10 to 50 phr of a high vinyl polybutadiene having a Tg ranging from −40 C to −5 C and has an isomeric vinyl 1,2 content in a range of from 50 to 90 percent by weight, and from 10 to 30 phr of a natural rubber or synthetic polyisoprene, silica, a blocked mercaptosilane, a traction resin, and a liquid plasticizer selected from the group consisting of a low molecular weight polybutadiene functionalized with a hydroxyl functional group and vegetable oils.

In one embodiment, the rubber composition includes from 30 to 80 phr of a styrene-butadiene rubber functionalized with at least one functional group selected from the group consisting of alkoxysilane groups, sulfur containing functional groups and amino functional groups. Suitable sulfur containing groups include thiol, thioether, thioester, sulfide, or sulfanyl group. Suitable amino functional groups include primary, secondary, and tertiary amino groups. Additional examples of rubbers which may be used include solution polymerized styrene-butadiene functionalized with groups such as alkoxy including monoalkoxy, dialkoxy, and trialkoxy, silyl, thiols, thioester, thioether, sulfanyl, mercapto, sulfide, and combinations thereof. Such functionalized solution polymerized polymers may be functionalized at the polymer chain ends for example via functional initiators or terminators, or within the polymer chains for example via functional monomers, or a combination of in-chain and end-of-chain functionalization. Specific examples of suitable functional solution polymerized polymers include those described in U.S. Pat. Nos. 8,217,103 and 8,569,409 having alkoxysilyl and sulfide (i.e. thioether) functionality. Such thiol functionality includes thiol or sulfanyl functionality arising from cleavage of sulfur containing groups during compound processing, such as for example from thioesters and thioethers.

In one embodiment, the styrene-butadiene rubber is obtained by copolymerizing styrene and butadiene, and characterized in that the styrene-butadiene rubber has at least an alkoxysilyl group appended to the polymer chain. In one embodiment, the alkoxysilyl group is an ethoxysilyl group.

The functional group or groups may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a functional group to react it with a living polymer chain terminal at the time when the polymerization has substantially completed, and then conducting deblocking, for example, by hydrolysis or other appropriate procedure in the case of blocked functional groups.

The solution polymerized styrene-butadiene rubber has a glass transition temperature in a range from −70° C. to −40° C., alternatively from −65 to −45° C. A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

Suitable functionalized styrene-butadiene rubbers are available commercially, such as Sprintan SLR 3402 from Trinseo and F1038 from LG Chemical.

The rubber composition also contains from 10 to 50 phr of a high vinyl polybutadiene. Suitable high vinyl polybutadiene has a Tg ranging from −40 C to −5 C and has an isomeric vinyl 1,2 content in a range of from 50 to 90 percent by weight. Such high vinyl polybutadiene may be produced using anionic polymerization methods with lithium catalysts as are known in the art. The high vinyl polybutadiene may be functionalized with at least one functional group including alkoxysilyl, hydroxyl, epoxy groups, amino, carboxyl, maleic groups, and maleimide groups. The high vinyl polybutadiene may be functionalized at the polymer chain ends for example via functional initiators or terminators, or within the polymer chains for example via functional monomers, or a combination of in-chain and end-of-chain functionalization.

The rubber composition also contains from 10 to 30 phr of a natural rubber or synthetic polyisoprene. Such synthetic cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition also contains from 3 to 20 phr of a blocked mercaptosilane include blocked forms of mercapto alkylalkoxysilanes, such as mercaptopropyl triethoxysilane, mercaptopropyl trimethoxysilane, mercaptopropyl methyldimethoxysilane, mercaptopropyl methyldiethoxy silane, mercaptopropyl dimethymethoxysilane, mercaptoethyl triethoxysilane, and mercaptopropyl tripropoxysilane. In each case a blocking group may be bonded to the mercapto sulfur, such blocking group form thioesters —C(=O)—$C_nH_{2n+1}$, where n is from 1 to 10, thioethers, or silylsulfide groups. In one embodiment, the blocking group is a octanoyl group forming a thioester, and the blocked mercaptosilane is S-octanoylmercaptopropyltriethoxysilane (otherwise known as 3-octanoylthio-1-propyltriethoxysilane) available at NXT from Momentive.

The rubber composition includes a liquid plasticizer selected from the group consisting of a low molecular weight polybutadiene functionalized with a hydroxyl functional group and vegetable oils.

Suitable liquid polymer should have double bonds that can react with sulfur and the polymer matrix to form cross-links. Suitable liquid polymers are derived from conjugated diolefin (or diene) monomers. Such liquid polymers can also contain repeat units which are derived from other monomers which are copolymerizable with conjugated diolefin monomers.

For instance, the liquid polymer can also contain repeat units which are derived from vinyl aromatic monomers, such as styrene. Polybutadiene rubber, polyisoprene rubber, styrene-butadiene rubber, isoprene-butadiene rubber, styrene-isoprene rubber and styrene-isoprene-butadiene rubber are some representative examples of polymers which can be used as the liquid polymer.

The liquid polymers are functionalized with at least one functional group including alkoxysilyl, hydroxyl, epoxy groups, amino, carboxyl, maleic groups, and maleimide groups. The liquid polymers may be functionalized at the polymer chain ends for example via functional initiators or terminators, or within the polymer chains for example via functional monomers, or a combination of in-chain and end-of-chain functionalization.

The liquid polymers are low molecular weight rubbery polymers of conjugated diolefin monomers. These low molecular weight rubbery polymers will also typically be comprised of repeat units which are derived from one or more conjugated diolefin monomers. Such low molecular weight rubbers can also, of course, contain repeat units which are derived from other monomers which are copolymerizable with conjugated diolefin monomers. For instance, the low molecular weight rubbery polymer can contain repeat units which are derived from vinyl aromatic monomers, such as styrene. Low molecular weight polybutadiene rubber, low molecular weight polyisoprene rubber, low molecular weight styrene-butadiene rubber, low molecular weight isoprene-butadiene rubber, low molecular weight styrene-isoprene rubber and low molecular weight styrene-isoprene-butadiene rubber are some representative examples of low molecular weight rubbery polymers which can be modified to make the wetting agents of this invention. The low molecular weight rubbery polymer will typically have a weight average molecular weight which is within the range of about 1000 to about 25,000 g/gmol. The low molecular weight rubbery polymer will more typically have a weight average molecular weight which is within the range of about 2000 to about 15,000 g/gmol.

The weight average molecular weight Mw may be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The detector used is preferably an ultraviolet detector. The fraction of chains existing as mono chains is determined as the ratio of the areas under the GPC curve, i.e., (mono chain peak area)/(total area).

Suitable vegetable oils include sunflower oil, safflower oil, canola oil, and soybean oil, and the like. In one embodiment, the vegetable oil is sunflower oil.

In one embodiment, the rubber compositions include from 3 to 30 phr, alternatively, 3 to 15 phr of the liquid plasticizer selected from the group consisting of functionalized liquid polymer and vegetable oil.

In one embodiment, the rubber composition includes from 3 to 30 phr of a polybutadiene functionalized with primary hydroxyl groups at each terminus and having a molecular weight Mw ranging from 1000 to 25000 g/gmol, alternatively 2000 to 4000 g/gmol, and a Tg ranging from −50° C. to −20° C. In one embodiment, the hydroxyl functionalized polybutadiene is Krasol LBH-P 2000 from Cray Valley.

The rubber composition includes a resin.

In one embodiment, the rubber composition includes from 10 to 45 phr of a resin selected from the group consisting of hydrocarbon resins, phenol/acetylene resins, rosin derived resins and mixtures thereof.

Representative hydrocarbon resins include coumarone-indene-resins, petroleum resins, terpene polymers and mixtures thereof.

Coumarone-indene resins are commercially available in many forms with melting points ranging from 10 to 160° C. (as measured by the ball-and-ring method). Preferably, the melting point ranges from 30 to 100° C. Coumarone-indene resins are well known. Various analysis indicate that such resins are largely polyindene; however, typically contain random polymeric units derived from methyl indene, coumarone, methyl coumarone, styrene and α-methyl styrene.

Petroleum resins are commercially available with softening points ranging from 10° C. to 120° C. Preferably, the softening point ranges from 30 to 100° C. Suitable petroleum resins include both aromatic and nonaromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene. Copolymer resins of styrene and α-methyl styrene may also be used.

Terpene polymers are commercially produced from polymerizing alpha pinene, beta pinene, or a mixture of pinenes in mineral spirits. The resin is usually supplied in a variety of melting points ranging from 10° C. to 135° C.

Phenol/acetylene resins may be used. Phenol/acetylene resins may be derived by the addition of acetylene to butyl phenol in the presence of zinc naphthlate. Additional examples are derived from alkylphenol and acetylene.

Resins derived from rosin and derivatives may be used in the present invention. Gum and wood rosin have much the same composition, although the amount of the various isomers may vary. They typically contain about 10 percent by weight neutral materials, 53 percent by weight resin acids containing two double bonds, 13 percent by weight of resin acids containing one double bond, 16 percent by weight of completely saturated resin acids and 2 percent of dehydroabietic acid which contains an aromatic ring but no unsaturation. There are also present about 6 percent of oxidized acids. Representative of the diunsaturated acids include abietic acid, levopimaric acid and neoabietic acid. Representative of the monounsaturated acids include dextroplmaris acid and dihydroabietic acid. A representative saturated rosin acid is tetrahy droabietic acid.

In one embodiment, the rubber composition includes from 10 to 40 phr of a polyterpene resin. Suitable polyterpene resins include Sylvares TRB 115 from Arizona Chemical. In one embodiment, the polyterpene resin may be a polymer of α-pinene such as Dercolyte A 115 from DRT.

The rubber composition may also include up to 25 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition includes from about 50 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Solvay, with, for example, designations of Z1165MP, Z165GR and Zeosil Premium 200MP and silicas available from Degussa AG with, for example, designations VN2 and VN3, etc.

Blends of two or more silicas may also be used, for example, a blend of a relatively high surface area silica combined with a relatively low surface area silica. In one embodiment, a blend may be used of a first silica having a surface area greater than 165 $m^2/g$, and a second silica having a surface area less than 130 $m^2/g$.

Commonly employed carbon blacks can be used as a conventional filler in an amount ranging from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

In one embodiment, the rubber composition may optionally contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

The amount of the optional sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarder, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

In one embodiment, the rubber compositions may include from 1 to 10 phr as a vulcanization modifier an $\alpha$, $\omega$-bis(N, N'-dihydrocarbylthiocarbamamoyldithio)alkane. Suitable $\alpha$,$\omega$-bis(N,N-dihy drocarbylthiocarbamamoyldithio)alkanes include 1,2-bis(N,N-dibenzylthiocarbamoyl-dithio)ethane; 1,3-bis(N,N'-dibenzylthiocarbamoyldithio)propane; 1,4-bis(N,N'-dibenzylth-iocarbamoyldithio)butane; 1,5-bis(N,N'-dibenzylthiocarbamoyldithio)pentane; 1,6-bis(N,N'-dibenzylthiocarbamoyldithio)hexane; 1,7-bis(N,N'-dibenzylthiocarbamoyldithio)heptane; 1,8-bis(N,N-dibenzylthiocarbamoyldithio)octane; 1,9-bis(N,N'-dibenzylthiocarbamoyldithio)nonane; and 1,10-bis(N,N'-dibenzylthiocarbamoyldithio)decane. In one embodiment, the vulcanization modifier is 1,6-bis(N,N'-dibenzylthiocarbamoyldithio)hexane available as Vulcuren from Bayer.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 80° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, the effect of a hydroxy-terminated polybutadiene on the performance of a tread compound is illustrated. Rubber compositions were mixed in a multi-step mixing procedure following the recipes in Table 1, with all amounts given in phr. Standard amounts of curatives were also included. Rubber compounds were then cured and tested for rolling resistance (RR) and wet and dry braking performance, with results given in Table 2.

TABLE 1

| | Sample No. | | |
|---|---|---|---|
| | Control | Inventive 1 | Inventive 2 |
| BR[1] | 10 | 0 | 0 |
| BR[2] | 0 | 20 | 35 |
| SBR[3] | 40 | 0 | 0 |
| SBR[4] | 50 | 0 | 0 |
| SBR[5] | 0 | 60 | 45 |
| Natural Rubber | 0 | 20 | 20 |
| Silica[6] | 112 | 110 | 120 |
| Carbon Black | 0 | 5 | 0 |
| Silane[7] | 11.2 | 0 | 0 |
| Silane[8] | 0 | 13.2 | 14.4 |
| Silane[9] | 2 | 0 | 2 |
| Traction resin[10] | 12 | 0 | 0 |
| Traction resin[11] | 0 | 30 | 36 |
| Liquid Polymer[12] | 0 | 10 | 0 |
| TDAE oil[13] | 38.784 | 3 | 2.25 |
| Sunflower oil | 0 | 0 | 9 |

[1]High cis Neodymium BR, Tg = −106° C. obtained from Goodyear Chemical Division as BUDENE1223
[2]Functionalized High Vinyl (77%) LiBR, Tg = −27° C., obtained from Nizhnekamskneft-ekhim Chemical as SKD-L/BR777
[3]Solution polymerized SBR with styrene content of 40% and 1,2-vinyl content of 14.4%, Tg = −34° C., extended with 37.5 phr TDAE oil, obtained from Trinseo as SE SLR6430.
[4]Solution polymerized SBR with styrene content of 34% and 1,2-vinyl content of 38%, Tg = −28° C. extended with 37.5 phr TDAE oil, obtained as Tufdene E680 from JSR.
[5]Solution polymerized SBR with styrene content of 10% and 1,2-vinyl content of 38%, Tg = −56° C., extended with 5 phr TDAE oil, obtained from LG Chem as F1038.
[6]Zeosil Premium 200MP from Solvay
[7]TESPD type silane coupling agent, as Si266 from Evonik.
[8]S-octanoylmercaptopropyltriethoxysilane, as NXT* from Momentive
[9]TESPD type silane coupling agent, 50% on carbon black as X50S from Evonik.
[10]Styrene and alpha-methylstyrene resin, Tg = 39° C., obtained as Sylvares SA85 from Arizona Chemicals.
[11]Terpene resin, Tg = 70° C., obtained as Dercolyte A115 from D.R.T.
[12]Polybutadiene end functionalized with hydroxyl groups, Mw = 2100, Tg = −35° C., as Krasol LBH-P 2000 from Cray Valley
[13]Includes extension oil and added oil

TABLE 2

|  | Control | Inventive 1 | Inventive 2 |
|---|---|---|---|
| RR | 100 | 118 | 120 |
| Wet braking | 100 | 97 | 99 |
| Dry braking | 100 | 98 | 98 |

As can be seen in Table 2, the rolling resistance performances can be considerably improved with minimum impact on wet braking and dry braking, using high vinyl polybutadiene, hydroxy-terminated polybutadiene or sunflower oil, and terpene resin.

The invention claimed is:

1. A pneumatic tire comprising a tread, the tread comprising a rubber composition comprising from 30 to 80 phr of a styrene-butadiene rubber having a Tg ranging from −70° C. to −40° C., from 10 to 50 phr of a high vinyl polybutadiene having a Tg ranging from −40° C. to −5° C. and has an isomeric vinyl 1,2 content in a range of from 50 to 90 percent by weight, and from 10 to 30 phr of a natural rubber or synthetic polyisoprene, silica, a blocked mercaptosilane, a traction resin, and from 3 to 30 phr of a low molecular weight polybutadiene functionalized with a hydroxyl functional group and having a molecular weight Mw ranging from 1,000 to 25,000 g/mol and a Tg ranging from −50° C. to −20° C.

2. The pneumatic tire of claim 1, wherein the styrene-butadiene rubber is functionalized with at least one functional group selected from the group consisting of alkoxysilane groups, sulfur containing functional groups, and primary amino functional groups.

3. The pneumatic tire of claim 1, wherein the rubber composition comprises as the blocked mercaptosilane from 3 to 20 phr of S-octanoylmercaptopropyltriethoxysilane.

4. The pneumatic tire of claim 1, further comprising a sunflower oil present in an amount ranging from 2 to 30 phr.

5. The pneumatic tire of claim 1, wherein the rubber composition comprises from 50 to 150 phr of silica.

6. The pneumatic tire of claim 1, wherein the first rubber composition comprises from 1 to 10 phr of carbon black.

7. The pneumatic tire of claim 1, wherein the rubber composition includes as the traction resin from 10 to 45 phr of a resin selected from the group consisting of hydrocarbon resins, phenol/acetylene resins, rosin derived resins and mixtures thereof.

8. The pneumatic tire of claim 1, wherein the rubber composition includes as the traction resin from 10 to 45 phr of a terpene resin.

9. The pneumatic tire of claim 1, wherein the traction resin is a terpene resin comprising a polymer of α-pinene.

10. A pneumatic tire comprising a tread, the tread comprising a rubber composition comprising
100 phr of elastomers consisting of the following A, B, and C:
A) from 30 to 80 phr of a one styrene-butadiene rubber having a Tg ranging from −70° C. to 40° C.,
B) from 10 to 50 phr of a high vinyl polybutadiene having a Tg ranging from −40° C. to −5° C. and has an isomeric vinyl 1,2 content in a range of from 50 to 90 percent by weight, and
C) from 10 to 30 phr of a natural rubber or synthetic polyisoprene;
10 to 45 phr of a terpene resin;
3 to 30 phr of a low molecular weight polybutadiene functionalized with a hydroxyl functional group and having a molecular weight Mw ranging from 1,500 to 2,500 g/mol and a Tg ranging from
−50° C. to −20° C.;
up to 25 phr of a processing oil;
50 to 150 phr of silica;
from 3 to 20 phr of a S-octanoylmercaptopropyltriethoxysilane; and
1 to 10 phr of carbon black.

11. The pneumatic tire of claim 10, wherein the silica comprises a blend of two silicas having a surface area between 125 and 250 m²/g.

12. The pneumatic tire of claim 10, wherein terpene resin comprises a polymer of α-pinene.

* * * * *